United States Patent [19]

Stanley

[11] Patent Number: 4,784,263

[45] Date of Patent: Nov. 15, 1988

[54] SAW BLADE CARRIER

[76] Inventor: Jeffrey A. Stanley, 4374 Ojai Rd., Santa Paula, Calif. 93060

[21] Appl. No.: 71,632

[22] Filed: Jul. 9, 1987

[51] Int. Cl.⁴ ............................................ B65D 85/00
[52] U.S. Cl. .................................. 206/349; 206/303; 206/310; 206/372; 206/445; 220/288; 220/304
[58] Field of Search ............... 206/349, 445, 303, 310, 206/309, 372, 45.34; 220/288, 304

[56] References Cited

U.S. PATENT DOCUMENTS

| 2,987,843 | 6/1961 | Anthony | 206/45.34 X |
| 4,415,080 | 11/1983 | Romine et al. | 206/349 X |
| 4,577,756 | 3/1986 | Hennessy et al. | 206/310 X |

FOREIGN PATENT DOCUMENTS

| 178795 | 10/1935 | Switzerland | 206/45.34 |
| 1137395 | 12/1968 | United Kingdom | 206/45.34 |
| 1211166 | 2/1986 | U.S.S.R. | 206/303 |

Primary Examiner—William Price
Attorney, Agent, or Firm—Marvin E. Jacobs

[57] ABSTRACT

A carrier for circular saw blades is provided having a spindle mounted on a base member. A cylindrical cover has a threaded insert which spins onto the top of the spindle and seats on the rim of the base to form a waterproof compartment. A stand can be provided to lift the lowest blade off the surface and a cavity in the bottom of the base can be used to store a blade tool.

11 Claims, 2 Drawing Sheets

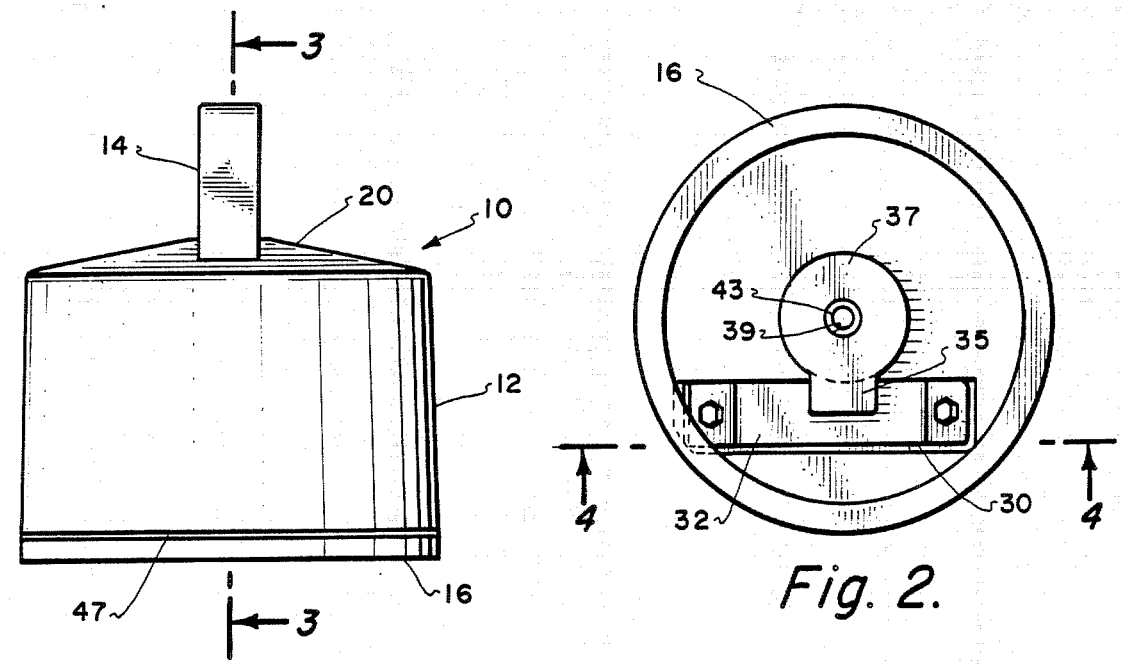
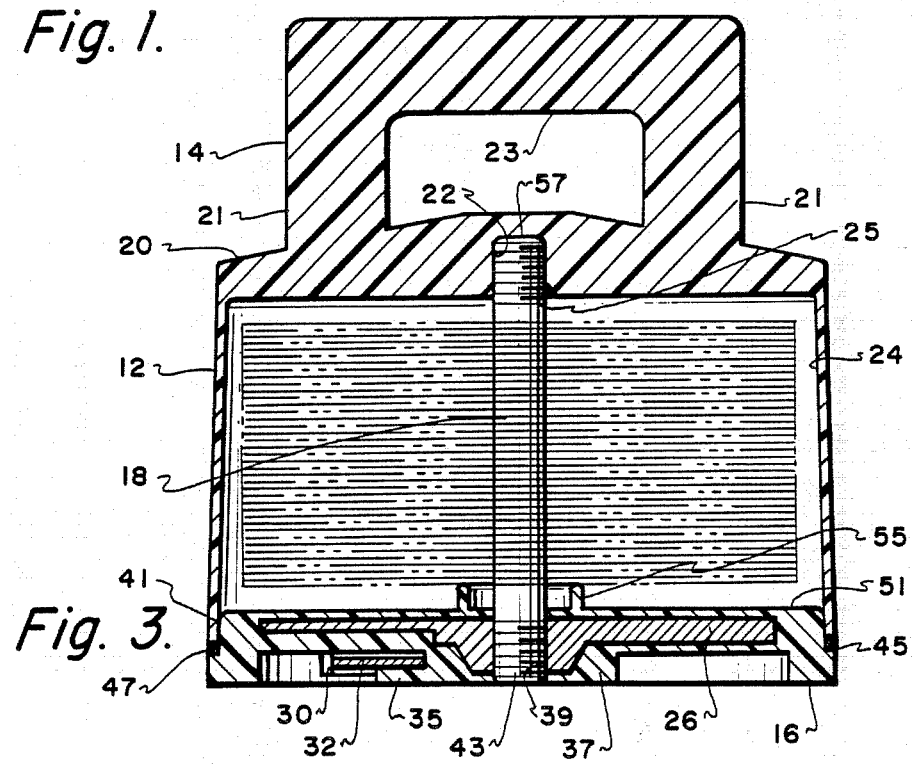
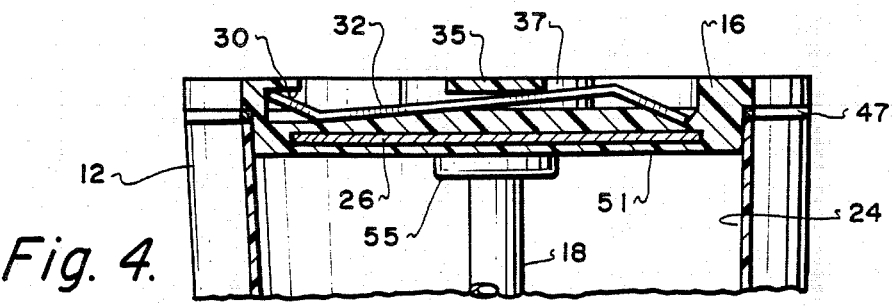

SAW BLADE CARRIER

TECHNICAL FIELD

The present invention relates to a protective tool carrier and, more particularly, this invention relates to a carrier for circular saw blades.

Circular saw blades are the most important tool of a framing or finish carpenter. Many times, the blades become chipped or dull during a job necessitating replacement. In order to prevent lost time, a carpenter usually carriers more than one blade. When he has accumulated enough dull or chipped blades, he takes them to a service for resharpening and/or repair. The blades are heavy and if they contact another hard material, such as a concrete or metal floor, they will chip or, if they contact a softer material such as another tool, they will gouge the other material. Carbide-edged, steel blades are brittle and are even more susceptible to being chipped.

These occurrences are quite likely to happen on a construction job site which is usually not well organized. There is frequent movement of building supplies and there is usually simultaneous activity be several different subcontractors with movement of ladders, scaffolding and materials which can cause unintended contact with the saw blades or can cause damage by upset of tools and tool boxes. Circular saw blades are expensive and are an attractive item to be stolen on the job. Furthermore, new construction requires working in an open environment subject to the elements before the roof, walls and windows are in place. Many times, extra blades that a carpenter must carry get wet from rain or other sources of water on the job and develop rust spots.

DESCRIPTION OF THE PRIOR ART

One apparent way to carry a set of blades from the home to the job or to a sharpening shop is to house them in a carrier. Though blade carriers are not commercially available, there are disclosures of blade carriers in the patent literature.

Chase (U.S. Pat. No. 483,991) shows a packing case for a single blade comprising a base, cover and threaded shaft. This is not a multiple-carrying case and there is not protection from water since there is no seal between the cover and the case. The case is made of pressed pulp and would not have sustained life in a humid environment. Ridings (U.S. Pat. No. 4,588,082) is another example of a single blade carrier. Ridings uses a single piece of plastic having two scored lines functioning as live hinges which fold to form a carrier with open sides. Segal (U.S. Pat. No. 2,459,460) discloses a packing case in which a cylindrical well is formed to receive a single blade having brittle and fragile carbide-tipped teeth.

Hite (U.S. Pat. No. 3,870,148) discloses a carrying case for saw blades in the form of a rectangular case with a hinged top. The blades are free to move within compartments formed by separator inserts.

Reinhard's (U.S. Pat. No. 3,053,424) saw blade carrier secures the blades vertically in an open carrier with a horizontal spindle. The blades are constrained from moving. However, the blades are exposed to the elements and the exposed sharp edges can be chipped or can cause wounds or damage to person or property. Romine (U.S. Pat. No. 4,415,080) discloses a slitter blade carrying case comprising a cover for a base having an upright post for receiving the central aperture in the blades. A rotatable handle is mounted on the flat surface of the cover by means of two washers on a shaft having a threaded end received in a threaded cavity in the top of the post.

The carrier is not waterproof since the rotatable shaft must have clearance to operate. Furthermore, water can accumulate on the flat top and leak under the washer and drain into the interior. Also, all the weight is concentrated at the two washers. If a plurality of heavy blades were carried, the handle would either bend the top or pull through the top. The rotatable handle makes manipulation of the cover difficult when the base is at an angle. The cover will tend to rotate rather than tilt.

Carrying cases for other items such as razor blades, film reels, disc packs, phonograph records or food containers are described in the following United States patents:

| PATENTEE | U.S. PAT. NO. |
|---|---|
| Stetson | 1,028,626 |
| Nist | 2,030,465 |
| Ferrer | 3,378,183 |
| Wirth | 3,736,777 |
| Campbell | 4,085,875 |
| Hayes | 4,311,237 |

STATEMENT OF THE INVENTION

An improved carrier for circular saw blades is provided by the present invention. The carrier is easy to use and waterproof under all conditions of carriage and storage. The carrier is contoured so that water cannot collect on the top surface and there is no aperture allowing ingress of water to the interior to cause deterioration of the blades. The blades are securely held so that they cannot gouge or affect other materials they contact and they are securely enclosed so that they are not chipped or cracked by unnecessary contact with other hard or brittle materials.

The circular saw blade carrying case of the invention is formed of a dome-shaped cover member having a generally cylindrical body the end of which fits onto a base. A central threaded spindle is mounted on the base. The cover contains a threaded insert on its interior surface which screws on to the spindle to securely close the case. A large, square handle is attached to the cover to provide large, load-bearing capacity.

In use, the cover is removed by applying a turning force to the handle to rotate the cover until the threaded insert leaves the threaded spindle. The cover is then lifted and blades are placed on the spindle either directly in contact with each other or spaced from each other by spacers formed of plastic, cardboard, foam or other suitable material. The spindle can be contoured to fit the opening in the blades or knock-out bushings, which fit into the opening, can be utilized. When the blades are loaded, the cover is lifted by the handle, placed on the base and the spindle self-centers into the threaded insert. The cover is then rotated to spin the spindle into the upper threaded insert and to press the bottom edge of the cover against the base to form a secure seal of the only opening in the carrier.

Another feature of the invention is the provision of a cavity in the bottom for the saw blade tool. Many times this tool is misplaced or is difficult to find within a tool box when needed. By providing a place for carrying the tool in the carrier, the blade can readily be removed and stored without having to fumble or search for the tool.

It is much easier to assemble the blade carrier of the invention. The prior carriers secure the top by placing the aperture over a threaded spindle and use a nut to complete the assembly or by rotating a handle as in the carrier by Romine et al. The carrier of the invention is self-centering and the self-lubricating, mating parts of the base and the cover are easily assembled by spinning the cover on the base to lock the spindle into the threaded member. The cover of the invention is also simple in that only two parts are manufactured and not three and, again, is faster to assemble since there is no separate fastener or nut which has to be threaded on the shaft or spindle and rotated into place. The heavy self-centering cover of the invention is readily located onto the base and the weight of the cover causes it to rotate smoothly and evenly onto the base. The final locking is achieved by pressure on the handle to seat the two plastic members to form the waterproof seal.

These and many other objects and attendant features of the invention will become apparent as the invention becomes better understood by reference to the following description when considered in conjunction with the accompanying drawings.

BRIEF DESCRIPTION OF THE DRAWINGS

FIG. 1 is a view in elevation of a first embodiment of a saw blade carrier in accordance with the invention;

FIG. 2 is a bottom view in elevation of the saw blade carrier of FIG. 1;

FIG. 3 is a view in section taken along the line 3—3 of FIG. 1;

FIG. 4 is a view in section taken along the line 4—4 of FIG. 2;

DETAILED DESCRIPTION OF THE INVENTION

Figures 5, 6:
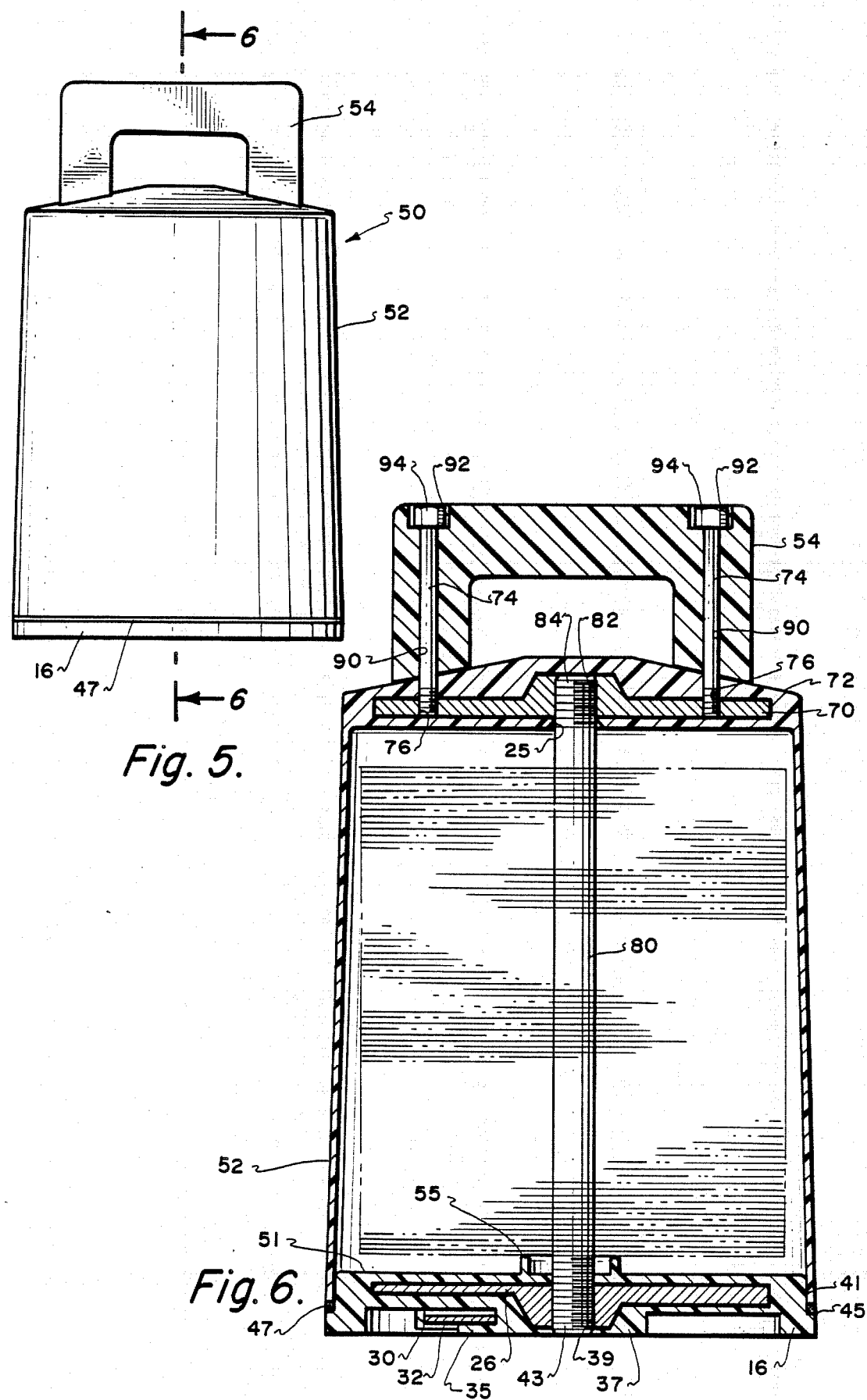
FIG. 5 is a front view in elevation, second embodiment of a saw blade carrier in accordance with the invention.
FIG. 6 is a view in section taken along the line 6—6 of FIG. 5.

Referring now to FIGS. 1-4, the first embodiment of the saw blade carrier 10 is formed of a cover 12 with a handle 14 which connects to a base 16. The cover has a tapered top 20 which is of convex shape to allow water to drain away from the carrier. The cover can be spheriod in section or can be conically shaped. A handle 14 can be integrally formed with the top 20. The handle preferably is of inverted U-shape in section having depending legs 21 connected by a cross-piece 23.

The base 16 has an elongated, rectangular cavity 30 for receiving a blade tool 32. A lip flange 35 extending from the central plate 37 serves to lock the tool in the cavity 30. The cavity 30 is located to one side of the central plate 37. A cylindrical plate 26 extends outwardly from the central disc portion 37. The plate 26 has a central threaded aperture 39 for receiving the lower threaded end 43 of the spindle 18. The plate 26 serves to reinforce the base 16 of the carrier, serves as a connector for the spindle 18 and provides the lip flange 35 for retaining the tool 32 in its cavity.

The outer edge of the base 16 is bevelled to form a conical surface 41 which aids in centering the cover 12 as it is placed on the base 16. The bevelled surface 41 is disposed inside from the outside surface of the base at a distance equal to the thickness of the side wall 24 of the cover 12 to forming a horizontal seating surface 45 on the base 16. This surface may be used to seat with the cover 12 or a gasket 47 may be provided to further assure the sealing of the cover to the base.

Rather than permit the lowest blade to rest on the platform 51 of the base 16, a short annular, cylindrical stand 55 may be provided surrounding the spindle 18 to form a stand. This raises the first blade above the platform 51 providing space for water to collect in case there is any condensation or entry of water into the carrier. A central, threaded aperture 22 is provided in the central inner top portion of the cover 12. The entry surface to the aperture 22 may be widened at 25 to provide a guide that helps to center the spindle 18 as the cover is placed on the base.

The carrier 10 is assembled by screwing the lower threaded end 43 of the spindle 18 into the threaded aperture 39 in the base plate 26. The tool 32 is snapped under the lip 35 and concealed in the cavity 30. The cover 12 is then grasped by handle 14 and slowly lowered until the top threaded end 57 of the spindle enters the widened guide 25 while simultaneously the side wall 24 is sliding along the bevelled edge 41 to center the cover on the spindle. The handle is then rotated to spin the cover onto the base until the bottom wall is sealed against the gasket.

The second embodiment of the carrier 50 shown in FIGS. 5 and 6 has a much larger capacity provided by an elongated cover 52. In order to accommodate the extra weight, a reinforcing plate 70 is also provided in the top 72 of the cover 52. The handle 54 can be secured to the cover 52 by fasteners 74 rather than being integrally molded with the cover. The reinforcing plate 70 can also be provided with threaded apertures 76 for connection to the fasteners 74. The central portion of the reinforcing plate 70 can form the threaded insert for the spindle 80 by means of internally threaded bore 82 for receiving the threaded end 84 of the spindle. The separate handle 54 contains a set of slots 90 for receiving the fasteners 74. The top portion of the slots 90 may be countersunk in 92 in order to recess the heads 94 of the bolt fasteners 74. Otherwise, the base 16 of the carrier has the same structure as that of FIG. 1 and like numbers refer to like parts throughout FIGS. 5 and 6.

The carrier is preferably formed of a tough engineering plastic as such materials are inert to the outside environment where carpenters usually work. Such materials also provide self-lubrication to help in the centering and mating of the cover to the base and the spindle to the cover. Suitable plastics are polyamides such as Nylon, high density polyethylene and polyester resins. The resins may contain fiber reinforcement to increase the strength of the parts. The materials are preferably high temperature thermoplastics such it would aid in forming the parts by injection molding.

It is to be understood that only preferred embodiments of the invention have been described and that numerous substitutions, modifications and alterations are permissible without departing from the spirit and scope of the invention as defined in the following claims.

What is claimed is:

1. A carrier for circular saw blades comprising in combination:

a base member formed of a tough, synthetic, resin material having a cylindrical groove for receiving a cover and having means for centrally supporting a spindle;

a spindle having an upper threaded end and a lower end received in the central supporting means;

a cover formed of a tough, synthetic, resin material having a top wall and a generally cylindrical side wall terminating in a lower end received in said groove and having a threaded recess in the inner surface of the top wall terminating in an enlarged opening to form a guide for centering the spindle into the recess; and a handle attached to said top wall, said cover and base when assembled forming a sealed, water-proof enclosure.

2. A carrier according to claim 1 in which the groove is formed on the outer surface of the base member.

3. A carrier according to claim 2 in which the inner vertical surface of the groove contains a bevelled surface to aid in centering the cover.

4. A carrier according to claim 3 in which the lower surface of the groove is horizontal to form a seating surface for the bottom edge of the cover.

5. A carrier according to claim 4 further including a gasket received on said seating surface.

6. A carrier according to claim 1 in which the top surface of the cover is convex.

7. A carrier according to claim 1 further including an annular, circular saw stand formed on the top surface of the base member surrounding the spindle.

8. A carrier for circular saw blades comprising in combination:

a base member formed of a tough, synthetic, resin material having a cylindrical groove for receiving a cover and having means for centrally supporting a spindle in the form of a reinforcing metal plate including a central threaded aperture for receiving and supporting the spindle embedded in the base member;

a spindle having an upper threaded end and a lower threaded end received in the central threaded aperture;

a cover formed of a tough, synthetic, resin material having a top wall and a generally cylindrical side wall terminating in a lower end received in said groove and having a threaded recess in the inner surface of the top wall; and a handle attached to said top wall, said cover and base when assembled forming a sealed, water-proof enclosure.

9. A carrier for circular saw blades comprising in combination:

a base member formed of a tough, synthetic, resin material having a cylindrical groove for receiving a cover and having means for centrally supporting a spindle;

a cavity formed in the bottom surface of the base member for holding a blade tool;

a spindle having an upper threaded and a lower end received in the central supporting means;

a cover formed of a tough, synthetic, resin material having a top wall and a generally cylindrical side wall terminating in a lower end received in said groove and having a threaded recess in the inner surface of the top wall; and a handle attached to said top wall, said cover and base when assembled forming a sealed, water-proof enclosure.

10. A carrier for circular saw blades comprising in combination:

a base member formed of a tough, synthetic, resin material having a cylindrical groove for receiving a cover and having means for centrally supporting a spindle;

a spindle having an upper threaded end and a lower end received in the central supporting means;

a cover formed of a tough, synthetic, resin material having a top wall and a generally cylindrical side wall terminating in a lower end received in said groove and having a threaded recess in the inner surface of the top wall;

a reinforcing metal plate having a central threaded aperture for receiving the threaded top end of the spindle embedded in said top wall; and a handle attached to said top wall, said cover and base when assembled forming a sealed, water-proof enclosure.

11. A carrier according to claim 10 in which the metal plate in the cover includes two threaded openings aligned with two threaded bores through the handle and two bolts received in the bores and into the threaded openings for securing the handle to the cover.

* * * * *